United States Patent [19]

Abu-Shumays et al.

[11] Patent Number: 4,971,381
[45] Date of Patent: Nov. 20, 1990

[54] HINGE MOUNTED SUN VISORS FOR AUTOMOBILES

[76] Inventors: Ibrahim K. Abu-Shumays; Mary D. Abu-Shumays, both of 1248 Varner Rd., Pittsburgh, Pa. 15227

[21] Appl. No.: 451,937

[22] Filed: Dec. 18, 1989

Related U.S. Application Data

[63] Continuation-in-part of Ser. No. 387,784, Aug. 1, 1989, Pat. No. 4,919,468, which is a continuation-in-part of Ser. No. 158,846, Feb. 22, 1988, abandoned.

[51] Int. Cl.[5] ............................................. B60J 3/02
[52] U.S. Cl. ........................... 296/97.9; 296/97.12; 16/389
[58] Field of Search ............ 296/97.9, 97.12, 97.13, 296/97.4; 16/387, 389

[56] References Cited

U.S. PATENT DOCUMENTS

| | | | |
|---|---|---|---|
| D. 100,587 | 7/1936 | Spencer et al. | 16/389 X |
| 1,284,333 | 11/1918 | Herzog | 16/387 |
| 1,363,372 | 12/1920 | Soss | 16/389 |
| 1,474,418 | 11/1923 | Larson | 16/387 |
| 1,599,183 | 9/1926 | Phillips | 296/97.13 |
| 2,100,427 | 11/1937 | Blocker | 296/97.4 X |
| 2,122,120 | 6/1938 | Thode | 296/97.4 |
| 2,183,413 | 12/1939 | Slick | 16/389 |
| 2,279,011 | 4/1942 | Nicholson | 296/97.4 X |
| 2,290,035 | 7/1942 | Conwell | 16/389 X |
| 2,372,977 | 4/1945 | North | 16/389 |
| 2,607,906 | 8/1952 | Sang | 296/97.4 |
| 2,617,680 | 11/1952 | Knoblock | 296/97.9 |
| 3,006,039 | 10/1961 | Brydolf | 16/389 X |
| 3,439,377 | 4/1969 | Bucholz | 16/389 |
| 3,472,549 | 10/1969 | Wiesmann | 296/97.9 |
| 4,666,205 | 5/1987 | Nakagawa | 296/97.9 X |

Primary Examiner—Margaret A. Focarino
Assistant Examiner—Joseph D. Pape

[57] ABSTRACT

Sun visors for independently and possibly simultaneously covering parts of the top of one or both of the front windshield and a front side window of an automobile whenever it is desirable to do so. Sun visors can also cover top parts of other windows of an automobile. The visors may be attached to the automobile by different types of hinge mechanisms. This invention also automates the function of some visors in such a way that the motion of a visor into the appropriate positon can be accomplished (a) manually, (b) by pressing conveniently located buttons connected to the car's electric system and to motors associated with the visors, and (c) by sun rays striking photocells placed at representative locations around top parts of the front windshield and the front side windows.

16 Claims, 2 Drawing Sheets

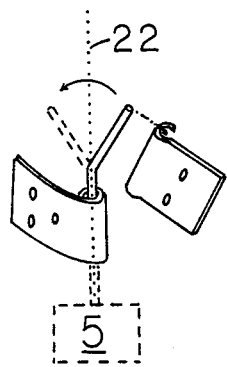
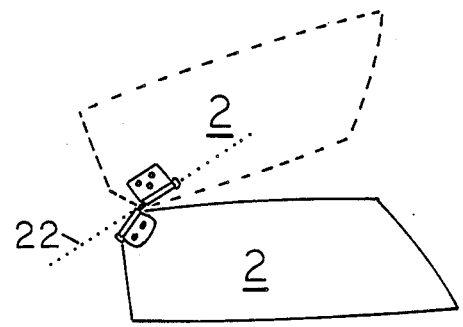
FIG. 7.　　　　FIG. 8.
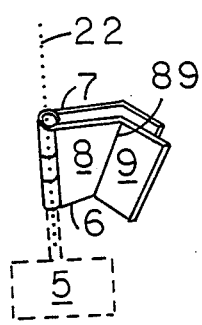
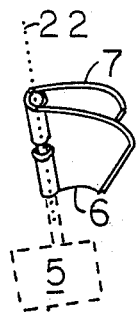
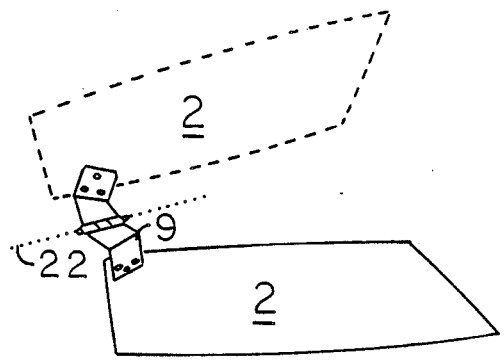
FIG. 9.　　FIG. 10.　　FIG. 11.

HINGE MOUNTED SUN VISORS FOR AUTOMOBILES

This is a continuation-in-part of application Ser. No. 387,784 filed Aug. 1, 1989, now U.S. Pat. No. 4,919,468 which is continuation-in-part of application Ser. No. 158,846 filed Feb, 22, 1988, now abandoned.

BACKGROUND OF THE INVENTION

1. Field of the Invention

This invention relates to improvements to sun visors for passenger cars and other vehicles aimed at protecting the eyes and enhancing visibility and comfort of the driver, the front seat passenger, and also other passengers.

2. Description of the Prior Art

Current passenger cars and similar vehicles (vans, trucks, etc.) are equipped with a single sun visor on the driver side and another on the passenger side. Each visor is movable and can cover at any one time only the front windshield, or a front side window but not both.

Visors are introduced here for added safety and comfort, especially in certain situations when it is desirable to simultaneously and independently cover critical locations of side windows and the front or back windshield.

The advantage here over prior art is the novelty of the design and the simplicity of manual or automatic operation.

SUMMARY OF THE INVENTION

This invention introduces sun visors for use on each of the driver and the front seat passenger sides of an automobile or a vehicle. This is in order to block sun rays coming from either the top parts of the front windshield or a front side window in situations where it is desirable to do so. Visors can also be used for other side windows. The objective is to enhance comfort of the driver (and comfort of other passengers), improve visibility, and contribute to safety.

Some of the visors introduced here can be moved manually, can be moved at the touch of a conveniently located button connected to the vehicle's electric system, and the motion in the latter case can also be triggered when sun rays of a prescribed pre-selected intensity strike conveniently located photocells.

No mention is made here of the material to construct the visors. It may be plastic, woodboard, metal, fabric, etc., or a combination of different materials. It is to be designed to match or contrast with a vehicle's interior decoration. Exact dimensions are not mentioned, since this is a relative matter and can be varied.

BRIEF DESCRIPTION OF THE DRAWINGS

The following drawings illustrate examples of the basic shapes which are the subject of this invention. Component parts shown with the same numbering scheme in different figures are either the same or are alternative embodiments of corresponding structures.

FIG. 1 also shows a perspective view of an alternative design of a visor 2 restricted for use on a side window. The visor 2 is shown in dashed lines in its stored (raised, rest) position and in solid lines in its used (lowered) position. The dotted lines 22 in this and other figures denote axes of rotation, each axis of rotation coincides with the axis of a cylindrical part of a pin of a hinge.

FIG. 5 serves as an illustration and clearly other hinges can be used in place of a joint hinge.

Note that both side plates, or one side plate of a hinge can be modified.

FIGS. 7 and 8 show a new design of a hinge where the pin of the hinge is bent. The two plates of this hinge shown lie essentially in the same plane in a closed position, but do not overlap in any position.

FIG. 7 shows the location of the pin in the open position and shows by the arrow the direction of rotation to achieve the rest or closed position indicated by the dashed lines. Also indicated in dashed lines is a possible motor arrangement 5 for automating the rotation of the pin of the hinge, thereby automating the possible motion of a visor.

FIG. 8 shows an application of the hinge of FIG. 7 to attach a visor 2 for use to cover the top part of a side window. The visor 2 is shown in its used position in solid lines, and in its stored position in dashed lines. Note that this hinge makes it possible to eliminate the need to slide the visor in order to cover the top of the slanted side of the window adjacent to the pillar. Another advantage of the present hinge is the ability to minimize or eliminate overlap of visors in their stored or rest positions.

Figure 6:
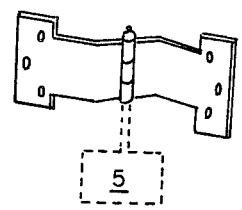
FIG. 6 shows an offset blind hinge in place of the hinge of FIG. 2.

FIGS. 9, 10 and 11 show a new design of a hinge which serves the same functions stated above in connection with FIGS. 7 and 8. The hinge here is similar to the offset blind hinge of FIG. 6, except for the fact that the faces of the plates of the hinge adjacent to the pin of the hinge are trapezoidal in FIG. 9 rather than rectangular. FIG. 10 shows a hinge with curved (part of an essentially conical surface) plates which for practical uses serves the same function as that of FIG. 9, the only difference being to allow the plane faces of the hinge of FIG. 9 to take on the curved form shown without an intersecting line in FIG. 10. FIGS. 9 and 10 also indicate in dashed lines possible motors 5 for automating the possible motion.

FIG. 11 shows an application of the hinge of FIG. 9 to attach a visor 2 for use to cover the top part of a side window. The visor 2 is shown in its used position in solid lines, and in its stored position in dashed lines.

The arrangements in FIGS. 8 and 11 can also be used for visors for the front windshield.

The new hinges described in FIGS. 7-11 have several other potential applications.

DESCRIPTION OF THE PREFERRED EMBODIMENTS

The main objective of this invention is to contribute to safety and at the same time add to the comfort and convenience of a driver and passengers of an automobile or similar vehicle. This is accomplished by making it possible to independently cover top parts of both a windshield and a side window whenever it is desirable to do.

Examples of the preferred embodiments of this invention are shown in FIGS. 1 to 11 discussed above.

Figure 1:
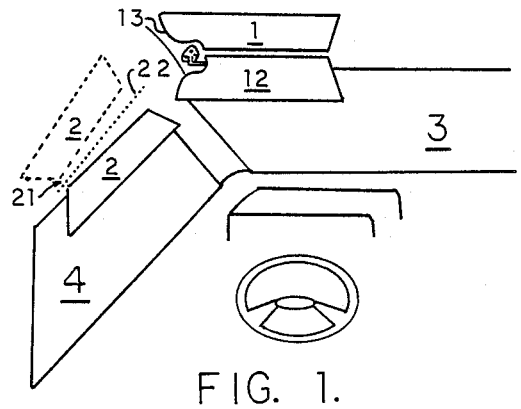
FIG. 1 is a perspective view of part of the interior of a car with dual visors 1 and 12 in one of their possible arrangements, 1 in its stored position and 12 in one of its used positions. The visors have comparable shapes and are of comparable length as is shown in this figure. The side 13 of each of the visors 1 and 12 closest to the bracket unit (closest to the pillar between the windshield and a side window) is curved in such a way as (a) not to interfere with the bracket unit during rotations, and yet (b) to provide a cover over a corner of the top part of a windshield during a lowered used position. The opposite side may also be curved in order not to interfere with the interior mirror when longer visors are desired.
Figure 2:
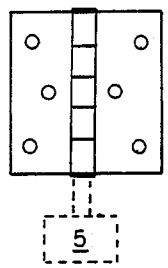
FIG. 2 shows a butt hinge, and indicates in dotted lines a possible motor 5 which can be added to rotate an extended part of the pin of the hinge, thereby automating the opening and closing of the hinge (one side of the hinge is to be fixed in place to a top part of a vehicle and the other side to a visor that can be rotated).
Figure 3:
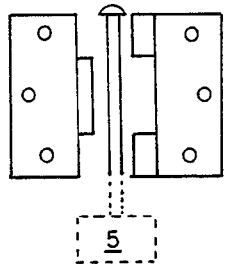
FIG. 3 shows a pin hinge in place of the butt hinge of FIG. 2.
Figure 4:
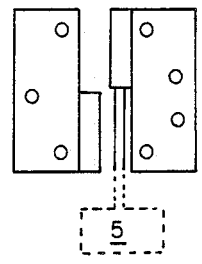
FIG. 4 shows a joint hinge in place of the butt hinge of FIG. 2.
Figure 5:
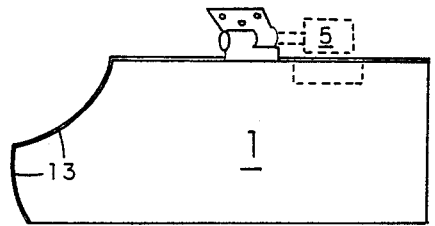
FIG. 5 is a perspective view of a visor 1 and its possible connection above the left (the driver's) side of a windshield by a joint hinge. The dashed lines indicate a possible modification of the shape of the visor to accommodate a motor 5 to automate the rotation of the visor between its normal rest or stored position and the front windshield.

A standard visor available in today's passenger cars is a variation on visor 12 shown in FIG. 1. This visor sits and can rotate around a rod axle. The rod axle in FIG. 1 is bent and is typically fastened to a top corner of a car's interior by a bracket unit. The arrangement makes it possible to rotate the rod axle and its associated visor in a horizontal direction. Thus, as a consequence of the ability to rotate visor 12 in a vertical direction around its rod axle, and the ability to rotate the rod axle in a horizontal direction, it is possible to position visor 12 at a top part of the front windshield or a top part of a front side window.

An improvement to the construction of a visor system, which may include the visor recited above, results when it becomes possible to accommodate a second visor 1 behind the visor 12 in the interior of the vehicle above the front windshield, or accomodate a second visor 2 to independently cover a side window.

Visor 1 is to be attached above the front windshield by a hinge, the same type as common door hinges, butt hinges, pin hinges, joint hinges, offset blind hinge, etc., except that here the hinge should be tight enough to hold the visor 1 in any angle between the top of a vehicle and the front windshield, yet the hinge should be sufficiently loose to allow rotation of the visor to any desirable position. The motion of the visor 1 in the present case can also be automated as is done these days for doors. A preferred approach is to modify a cylindrical part of the hinge which is associated with the visor and which turns with the visor; the modification involves adding teeth to it in the form of a partial spur gear and pressing a second motor-driven gear next to it to cause it to turn when the motor is turned on. Another preferred arrangment is to press a motor-driven friction gear against this cylindrical part to automate its rotation and the motion of the visor.

Yet another preferred arrangement shown in FIGS. 2-7, 9 and 10, is to extend the pin of a hinge and to connect it to a motor 5 in a manner to automate rotation of the pin and consequently automate rotation of the associated visor.

In either case, visor 12 can be rotated vertically and horizontally to positions along the top part of the front windshield or the top part of a front side window. Thus in most situations only visor 12 needs to be moved. In some situations when it is desirable to cover the top parts of both the front windshield and an adjacent front side window, visor 12 is moved to its position along the corner and top part of a side window and visor 1 is now free and can be rotated manually and/or automatically to cover a corner and top part of the front windshield.

Another arrangement of dual visors is to have two strictly front visors 1 each associated with one side of the top windshield 3, and to have strictly side visors 2 (see FIGS. 1-11), one associated with each side window. In this case visor 1 is the same as described above and can be rotated manually or automatically. In this case visor 1 cannot be moved towards a side window, and its edge 13 closest to the pillar need not be curved as required in FIGS. 1 and 5 to avoid interference with a bracket unit. The hinge of visor 2 can be any of the hinges shown in FIGS. 2-11. The motion of visor 2 can be accomplished manually and/or can be partially or totally automated.

One main advantage of the choice of certain visors which are restricted to cover a windshield or a side window, but not both, is the fact that their admissible motion is not likely to interfere with the driver's or a front seat passenger's face. In addition, the locations of visors 1 and 2 may be interchanged for an obvious equivalent design.

FIGS. 7, and 8 show the design of a hinge where the pin of the hinge is bent. FIG. 8 shows a corner of the visor cut off (implying that the exact shape of a visor is not critical and may vary in accordance with a car designer) and shows the slanted position of the movable part of the pin of the hinge relative to the visor. The orientation of the fixed part of the pin of the hinge is along a convenient dotted line shown as 22 in FIGS. 1, 7, and 8. Note that the dotted line 22 passes through the axis of the fixed part of the pin and serves as the axis of rotation. The degree to which the pin is bent, and the location of the line 22, determine the location of the stored or rest position of the visor and are appropriately left as variables to be chosen differently in accordance with differing car designs, the relative angle between the front windshield and a horizontal plane, and the desired exact locations of rest positions for the visors.

FIGS. 9 to 11 show a new design of a hinge which serves the same functions stated above in connection with FIGS. 7 and 8. The dotted lines 22 in these figures indicate the axes of rotation at the centers of fixed cylindrical parts of the pins of the hinges. The hinge in FIG. 9 is essentially similar to the offset blind hinge of FIG. 6, except for the fact that the faces 8 of the plates of the hinge adjacent to the pin of the hinge are trapezoidal rather than rectangular, with the side marked 6 shorter than the side marked 7 in FIG. 9. The plane faces 8 of each plate of the hinge are bent (intersect) along a line 89 not parallel to the pin of the hinge. The ratio of the length of 6 to the length of 7, the actual length of the various sides of the hinge, the corresponding relative orientation of the hinge to the visor, the exact location of the other fixed side of the hinge to be attached to a suitable location on top of the interior of a car adjacent to a side window, the length and width of a visor, and also the angle between the two faces of each side plate of the hinge (the degree to which each side of the hinge is bent) are appropriately left as variables. These variables are to be chosen differently in accordance with differing car designs, the relative angle between the front windshield and a horizontal plane, and the desired exact locations of rest positions for the visors. FIG. 11 shows that the visor 2" is mounted to the face 9 of the hinge and thus the face of the visor would essentially be parallel to that of this face 9. The arrangement in FIGS. 9 and 11, and the trapezoidal shape of the face 8 of the plate of the hinge is such that the axis of rotation 22 is parallel to the face 8, is skewed relative to the line 89, and is neither parallel nor perpendicular to the face 9 or the face of the visor 2.

The hinge of FIG. 10 can be viewed as a variation to that of FIG. 9 whereby the sharp interface between the faces of a plate of the hinge are smoothed out.

FIGS. 7, 9 and 10 also indicate in dashed lines possible motors 5 for automating the possible motion.

SCOPE OF THE INVENTION AND NOTATIONAL CLARIFICATON

Some of the hinges shown in FIGS. 7 to 11 are for use on a left side window, and their equivalent hinges needed for right side windows are implied and details are omitted for brevity. New hinges introduced in this invention have other potential applications.

A simple hinge as used in this invention and in the claim refers to a structure on which a door, visor, etc., can swing, comprised of (a) a pin which acts in part as a pivot, and (b) two plates having cylindrical parts surrounding the pin which act as clamps holding onto the pin. The plates have holes for mounting to objects by appropriate screws.

CLAIMS

While we have illustrated and described several embodiments of our invention, it will be understood that these are by way of illustration only and that various changes, extensions and modifications may be contemplated in this invention and within the scope of the following claims.

We claim:

1. A sun visor mounted securely to a top interior part of an automobile by a single hinge; said visor is rotatable around an axis of said hinge between a top stored position and a lowered used position; the main function of said visor being to shade a top part of either a windshield or a side window of said automobile, but not both;
    said hinge is comprised of (a) a pin which acts in part as a pivot, and (b) two plates having cylindrical parts surrounding the pin; said pin of the hinge is oriented such that the axis around which said visor can rotate is neither parallel nor perpendicular to a face of said visor when said visor is in the lowered used position;
    said cylindrical parts of the plates surrounding the pin act as clamps and are (a) sufficiently loose around the pin to allow rotation of the visor with little tension, yet (b) sufficiently tight to hold the plates and visor in any position following partial rotations.

2. A sun visor as recited in claim 1 wherein said visor can be actuated manually and can also be actuated by motor means.

3. A sun visor as recited in claim 1 wherein:
    each plate of said simple hinge is bent along a line not parallel to the pin of the hinge, and has two plane faces having a suitable angle between them, the plane face adjacent to said pin is trapezoidal in shape and is parallel to the axis of said pin.

4. A sun visor as recited in claim 3 wherein said visor can be actuated manually and can also be actuated by motor means.

5. A sun visor as recited in claim 1 wherein said visor is securely mounted to a top interior part of an automobile by a joint hinge;
    the cylindrical parts of the plates surrounding the pin of said joint hinge act as clamps and are (a) sufficiently loose around the pin to allow rotation of the visor with little tension, yet (b) sufficiently tight to hold the plates and visor in any position following partial rotations.

6. A sun visor as recited in claim 5 wherein said visor can be actuated manually and can also be actuated by motor means.

7. A sun visor as recited in claim 1 wherein said visor is securely mounted to a top interior part of an automobile by an offset blind hinge;
    the cylindrical parts of the plates surrounding the pin of said offset blind hinge act as clamps and are (a) sufficiently loose around the pin to allow rotation of the visor with little tension, yet (b) sufficiently tight to hold the plates and visor in any position following partial rotations.

8. A sun visor as recited in claim 1 wherein said pin is bent between the cylindrical parts.

9. A sun visor as recited in claim 8 wherein said visor can be actuated manually and can also be actuated by motor means.

10. A sun visor as recited in claim 1 for use to shade a front side window of an automobile; said visor is mounted by a hinge to the top part of said automobile near a front side window;
    each plate of said hinge is curved in part analogous to a part of a conical surface.

11. A sun visor as recited in claim 10 wherein said visor can be actuated manually and can also be actuated by motor means.

12. A hinge on which an object such as a visor, can be mounted and can swing and rotate;
    said hinge is comprised of (a) pin which acts in part as a pivot, and (b) two plates having cylindrical parts surrounding the pin;
    each plate around the pin of said hinge is bent along a line not parallel to the pin and has two plane faces having a suitable angle between them, the plane face adjacent to said pin is trapezoidal in shape and is parallel to the axis of said pin.

13. A hinge as recited in claim 12 used to mount a visor to shade a front a side window of an automobile; said hinge mounts said visor to the top part of said automobile near a front side window;
    the cylindrical parts of the plates of said hinge surrounding the pin act as clamps and can be made (a) sufficiently loose around the pin to allow rotation of the plates and visor with little tension, and (b) sufficiently tight to hold the plates and visor in desirable positions following partial rotations.

14. A hinge as recited in claim 12 wherein the plates of the hinge can be actuated manually and can also be actuated by motor means.

15. A visor system comprised of two pairs of sun visors, one pair on the driver's side and one on the front seat passenger's side of an automobile; the system is capable in certain situations of simultaneously providing a continuous cover over adjacent corners and top parts of a front windshield and a front side window of said automobile;
    one sun visor of each pair of sun visors is mounted securely to a top interior part of said automobile by a hinge; said one sun visor is rotatable around an axis, of said hinge between a top stored position and a lowered used position;

said hinge is comprised of (a) a pin which acts in part as a pivot, and (b) two plates having cylindrical parts surrounding the pin;

said cylindrical parts of the plates surrounding the pin act as clamps and are (a) sufficiently loose around the pin to allow rotation of the sun visor associated with the hinge with little tension, yet (b) sufficiently tight to hold the plates and said sun visor in any position following partial rotations;

said pin of the hinge of said one sun visor is oriented such that the axis around which the visor can rotate is neither parallel nor perpendicular to a face of the visor when the visor is in a lowered used position.

16. A visor system as recited in claim 15 wherein each sun visor can be actuated manually and can also be actuated by motor means.

* * * * *